(12) United States Patent
Saenz De Ugarte Sevilla et al.

(10) Patent No.: US 8,820,479 B2
(45) Date of Patent: Sep. 2, 2014

(54) OIL LEVEL MAINTENANCE SYSTEM

(75) Inventors: Patrick Saenz De Ugarte Sevilla, Zamudio (ES); Jose Maria Zabala Zabala, Asteasu (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 137 days.

(21) Appl. No.: 13/531,816

(22) Filed: Jun. 25, 2012

(65) Prior Publication Data

US 2013/0001017 A1 Jan. 3, 2013

(30) Foreign Application Priority Data

Jun. 28, 2011 (ES) .................................. 201100727

(51) Int. Cl.
*F16H 57/04* (2010.01)
(52) U.S. Cl.
USPC ........................................................ 184/6.12

(58) Field of Classification Search
USPC ................................................ 184/6.12, 6.13
See application file for complete search history.

(56) References Cited

U.S. PATENT DOCUMENTS

| | | | | | |
|---|---|---|---|---|---|
| 2,743,627 | A | * | 5/1956 | Christeuson | ................ 74/606 R |
| 2,833,163 | A | * | 5/1958 | Trombley | ..................... 475/310 |
| 2,938,601 | A | * | 5/1960 | Brafford | .................... 184/103.1 |
| 3,189,126 | A | * | 6/1965 | May | ............................... 184/6.2 |
| 3,800,913 | A | * | 4/1974 | Schmitt | ........................ 184/6.13 |
| 6,845,743 | B1 | * | 1/2005 | Bishop | ..................... 123/195 C |
| 8,069,834 | B2 | * | 12/2011 | Riedel et al. | .............. 123/196 R |
| 8,292,036 | B2 | * | 10/2012 | Nishida | ........................... 184/6.2 |
| 2010/0031915 | A1 | * | 2/2010 | Riedel et al. | .............. 123/196 R |

* cited by examiner

*Primary Examiner* — William A Rivera
*Assistant Examiner* — Michael Riegelman
(74) *Attorney, Agent, or Firm* — Ladas & Parry LLP

(57) ABSTRACT

Oil level maintenance system for a gearbox (3) in a wind turbine comprising an intermediate tank (7) for determining the inlets (8.1, 8.2) and outlets (9.1, 9.2) of connection between the multiplication stages (6) of the gearbox (3) in the wind turbine and the external tank (5) for oil destined for the gearbox (3).

6 Claims, 1 Drawing Sheet

OIL LEVEL MAINTENANCE SYSTEM

OBJECT OF THE INVENTION

This invention is related to gearboxes with planetary, parallel or mixed stages used in high power wind turbines and, in particular, with the oil level maintenance systems for oil baths in the gearbox stages.

BACKGROUND OF THE INVENTION

Wind turbines are equipped with a drive train comprising a wind power rotor and an electric generator, which are connected together by a gearbox that delivers the torque from the turning rotor to the generator, which in turn creates electricity.

High power capacity wind turbines, i.e., machines with a rated power exceeding 4.5 MW, employ planetary-type gearboxes with at least two mixed planetary stages, gearboxes with parallel stages or even gearboxes with mixed stages. In other words, they are equipped with both planetary and parallel sorts, which require, regardless of the type of gearbox harnessed, lubrication systems with their corresponding oil baths for the different gearboxes stages. These lubrication systems are usually controlled by mechanical or electrical pumps, or by solenoid valves to guarantee that the oil remains at a sufficient level so that the parts of the gearbox with metal contacts are lubricated at all times.

During a wind turbine's lifecycle, there are long periods without connection to the power grid, viz., when erecting wind turbines in the wind farm, during maintenance tasks or whenever the electrical grid has failed. Consequently, during these periods, the wind turbine's lubrication systems stop functioning. The wind turbine, with the blades feathered, nevertheless has a certain rotation; hence its metal parts in contact must likewise be kept lubricated during this period of inactivity.

The gearbox oil could thus empty into an external tank for various reasons. During the periods in which the machine is active, the lubrication system pumps the oil into the external tank to maintain an adequate level for filtering and cooling the oil, returning it to the gearbox once these tasks have been concluded.

During periods of wind turbine inactivity, and given that the nacelle rests at a 6° angle with respect to the standing tower, set so with a view to preventing potential impact of the blades against the tower base during deflection generated under the force of the wind, the oil begins to drain into the external tank caused by the mere force of gravity at this angle. The foregoing, added to the splashes provoked by unloaded rotating gears and nonoperational lubrication systems, oil consequently does not return to the gearbox, causing the oil level of the baths in the various gearbox stages to descend, and resulting in the lack of lubrication for the different metal parts in contact.

DESCRIPTION OF THE INVENTION

An object of the invention is to preserve the oil levels in the baths of the stages in a gearbox, regardless of the type of gearbox, thus preventing losses during periods of wind turbine inactivity in which the gearbox turns without a load.

Another object of the invention is to develop a lubrication system that guarantees the return of the oil to the gearbox stages, during both active and inactive machine periods.

To do so, the invention incorporates an intermediate tank between the gearbox stages and the external oil tank, which determines as many oil inlets as the number of oil outlets from the gearbox stages, and two outlets, namely one connected to the external oil tank and the other to the gearbox stages.

The oil will thus enter the intermediate tank through the inlets from the gearbox stages. When the oil exceeds the maximum level in the intermediate tank, it is drained by the effect of gravity through the connection conduit to the external tank, while if the oil is less than this maximum level in the intermediate tank, the oil, by the theory of communicating vessels, shall pass directly to the gearbox stages through the lower outlet connection on the intermediate tank.

The system ensures that the oil level is kept constant, not only during active machine periods, in which the oil level is controlled using the lubrication system, but also during inactive periods, in which there is no connection to the power grid.

The system is easily installed and reduces gearbox oil consumption, which is moreover highly useful for offshore wind turbines to which, given their location, access is complicated and for which periods of inactivity could be comparatively prolonged.

These and other aspects of the invention will be described in more detail with the help of the drawings shown below.

DESCRIPTION OF THE PREFERENTIAL EMBODIMENT

Figure 1:
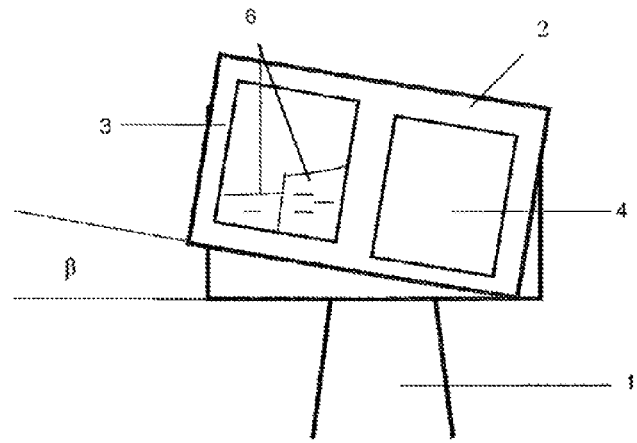
FIG. 1 is a schematic view of the nacelle's inclination compared with the horizontal plane of the tower.

As shown in FIG. 1, the wind turbine includes a tower (1), which supports a nacelle (2) that in turn houses a gearbox (3) and a generator (4) connected together. The nacelle (2) is inclined at a certain angle β with a view to keeping the rotor blades (not shown in the figure) from hitting against the tower (1) when the action of prevailing winds bends them.

During machine inactivity, the angle of the nacelle causes the lubricant inside the gearbox (3) to pass from the gearbox stages (3) to the external oil tank (5) whether from gear movement or the effect of gravity itself, hence reducing the oil level in the different stages (6) of the gearbox (3).

Figure 2:
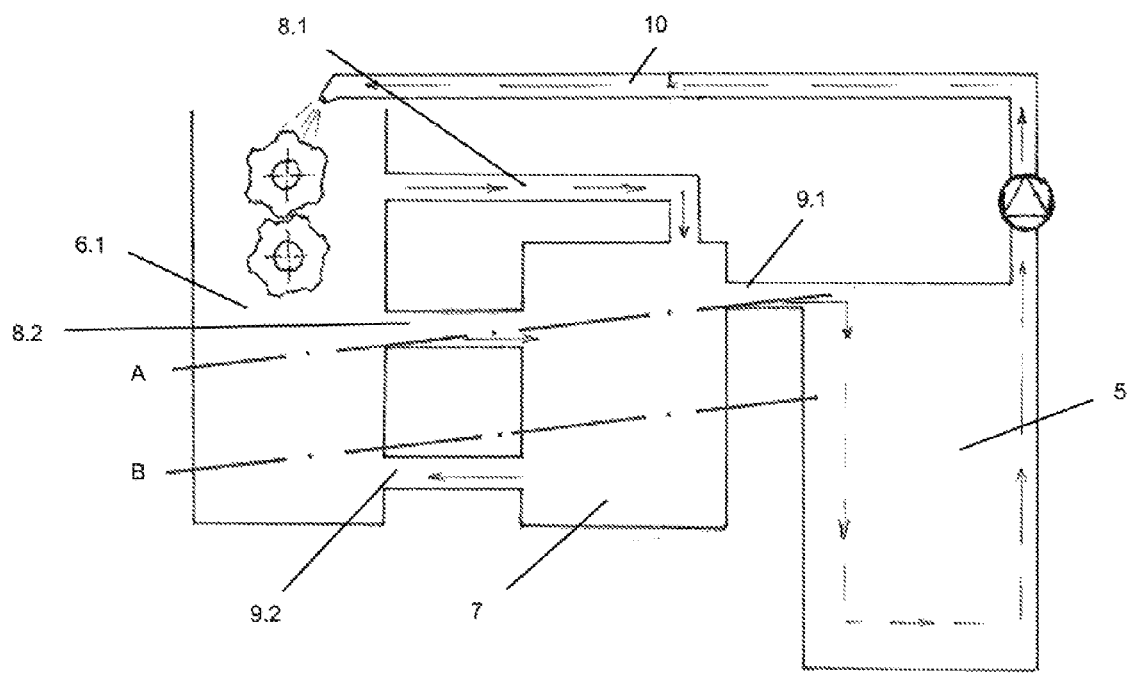
FIG. 2 represents the oil level maintenance system as per the invention.

FIG. 2 shows a schematic embodiment of the connection of a multiplication stage (6.1) of a gearbox (3) with the external oil tank (5) through the system conceived in this invention.

The oil level maintenance system comprises an intermediate tank (7) connected between at least one multiplication stage (6.1) of the gearbox (3) and the external tank (5) for oil.

The intermediate tank (7) has as many inlets (8.1, 8.2) as necessary to join all the possible oil outlets from the gearbox stages, and at least two outlets (9.1, 9.2) for oil, one to the multiplication stages (6.1) of the gearbox (3) and another towards the external oil tank (5) connected in turn to the multiplication stages (6.1) by a return (10).

These inlets (8.1, 8.2) and outlets (9.1, 9.2) are configured so that both the inlets (8.1, 8.2) as well as the outlet (9.1) to the external oil tank (5) are located above the maximum oil level (A) in the gearbox (3), while the outlet (9.2) to the last stage (6.1) in the gearbox (3) is located just below the minimum oil level (B) that could be present inside the gearbox (3).

Therefore, when the machine is inactive, the oil will return to the multiplication stage whenever underneath the maximum level A, since, due to communicating vessels, when expulsing the oil from the multiplication stage (6.1) towards the intermediate oil tank (7), the oil will return to the multiplication stage (6.1) instead of to the external tank (5) thus keeping it from emptying.

When the machine is active, the oil level maintenance system works in the same way as when the machine is inactive, so that if the oil inside the intermediate tank (7) from the multiplication stage (6.1) in the gearbox (3) exceeds the maximum oil level (A), this will drain by the effect of gravity through outlet (9.1) towards the external tank (5), while if the oil level inside the intermediate oil tank (7) is under the maximum level (A), all the oil from the different inlets (8.1, 8.2), is drained through the lower outlet (9.2) on the intermediate tank (7) returning to the multiplication stage (6.1) in the gearbox (3).

Although this invention has been presented entirely according to preferential embodiments, it is evident that modifications may be applied within its scope, which is not considered to be limited by the aforementioned embodiments, but rather by the content of the claims which follow.

The invention claimed is:

1. A system for maintaining oil inside a gearbox at least at a minimum level when oil is not being pumped into the gearbox and an inclination of the gearbox causes oil to drain from the gearbox by gravity, the system comprising:
    (a) the gearbox;
    (b) an intermediate tank;
    (c) an external tank;
    (d) first means for connecting the intermediate tank with the gearbox so that oil exiting the gearbox enters the intermediate tank;
    (e) second means for connecting the intermediate tank with the gearbox to cause the intermediate tank and the gearbox to communicate with each other such that, when oil exiting the gearbox enters the intermediate tank and settles to a level that is below a maximum level in the intermediate tank, the oil will pass from the intermediate vessel into the gearbox until the oil is at the same level in the intermediate tank and the gearbox; and
    (f) third means for connecting the intermediate tank with the external tank such that, when oil from the gearbox enters the intermediate tank and settles to a level that is above the maximum level, oil will drain from the intermediate vessel into the external tank by gravity.

2. The system according to claim 1, wherein the first means comprises a plurality of conduits connecting a plurality of outlets of the gearbox to a plurality of upper inlets of the intermediate tank, wherein the plurality of upper inlets are disposed in the intermediate tank above the maximum level.

3. The system according to claim 1, wherein the second means contains a conduit connecting a lower outlet of the intermediate tank to a lower inlet of the gearbox, wherein the lower outlet of the intermediate tank is disposed below a desired minimum level of oil in the intermediate tank.

4. The system according to claim 1, wherein the third means comprises a conduit connecting an upper outlet of the intermediate tank to an inlet of the external tank, wherein the upper outlet of the intermediate tank is disposed above the maximum level.

5. The system according to claim 1, wherein the gearbox comprises at least one multiplication stage and wherein, when oil in the intermediate tank is below the maximum level, the oil drains through a lower outlet of the intermediate tank and passes through a conduit to the at least one multiplication stage of the gearbox.

6. The system according to claim 1, wherein the gearbox comprises a plurality of gears selected from the group consisting of planetary gears, parallel gears and mixed gears.

* * * * *